United States Patent [19]

Burkel

[11] Patent Number: 4,550,009
[45] Date of Patent: Oct. 29, 1985

[54] METHOD OF MAKING BLOW-MOLDED PARTS OF THERMOPLASTIC MATERIAL

[75] Inventor: Heinz Burkel, Oberkotzau, Fed. Rep. of Germany

[73] Assignee: REHAU Plastiks AG & Co., Rehau, Fed. Rep. of Germany

[21] Appl. No.: 582,442

[22] Filed: Feb. 22, 1984

[30] Foreign Application Priority Data

Feb. 24, 1983 [DE] Fed. Rep. of Germany ....... 3306469

[51] Int. Cl.$^4$ .................. B29C 17/07; B29C 17/08
[52] U.S. Cl. .................................. 264/529; 264/531; 264/534; 264/536; 425/525; 425/527; 425/530
[58] Field of Search ............... 264/504, 529, 531, 534, 264/536; 425/525, 527, 530, 531

[56] References Cited

U.S. PATENT DOCUMENTS 3,004,285 10/1961 Hagen .............................. 264/536 X
3,764,644 10/1973 Robinson ........................ 425/525 X
3,821,344 6/1974 Peters ................................. 264/534

FOREIGN PATENT DOCUMENTS 2130176 12/1972 Fed. Rep. of Germany ...... 425/527

Primary Examiner—Jan Silbaugh
Attorney, Agent, or Firm—Spencer & Frank

[57] ABSTRACT

A blow-molded thermoplastic body is made by a method which comprises the following steps: inflating a hollow parison within a mold cavity for causing the parison to expand and conform to inner wall surfaces defining the mold cavity, whereby the blow-molded body is shaped; further inflating the blow-molded body within the mold cavity for causing a wall portion of the body to expand beyond the mold cavity into a port cavity communicating with the mold cavity thereby reducing the thickness of the wall portion; applying a counter pressure on an outer face of the wall portion for moving the wall portion back in the direction of the mold cavity against an inflating pressure prevailing within the blow-molded body, whereby connecting portions attaching the wall portion to the blow-molded body are reduced in thickness; and discontinuing the application of the counter pressure for allowing the wall portion to be driven anew away from the mold cavity into the port cavity by the inflating pressure. The wall portion separates entirely from the blow-molded body not later than upon finally discontinuing the application of the counter pressure.

4 Claims, 4 Drawing Figures

METHOD OF MAKING BLOW-MOLDED PARTS OF THERMOPLASTIC MATERIAL

BACKGROUND OF THE INVENTION

This invention relates to a method of for making blow-molded parts of thermoplastic material. The parts are formed from a hose-shaped parison after introducing it into a mold and closing the parison ends. The parison is expanded by pneumatic pressure for causing it to conform to the wall surfaces defining the mold cavity.

German Pat. No. 2,536,766 discloses a strip-shaped hollow body which is a closed, blow-molded part. Such blow-molded articles may be used as decorative or protective moldings. The parts are made by introducing a hose-shaped parison in a thermoplastic state into the mold, the ends of the parison are closed and the parison is expanded by inflation to thus assume the shape of the mold.

The inflation proper of the parison is effected by a hollow inflating needle or mandrel which pierces the parison while the mold is in a closed state. Air under pressure is introduced from the cavity of the blowing element into the inside of the parison and inflation pressure is generated therein which, as the wall thickness of the parison undergoes reduction, presses the parison wall against the inner walls of the mold cavity to thus produce the blow-molded part.

By means of a process outlined above, rigid blow-molded articles, such as decorative or protective moldings, bottles, and the like may be made. In the manufacture of bottles the hole through which inflation has taken place is enlarged to an opening of determined diameter by passing inflating or calibrating mandrels through the opening in the article.

In case such closed blow-molded bodies are, as semi-finished products, submitted to further processing, it has been found to be disadvantageous that in addition to the making of the body other, separate process steps have been necessary, for example, to provide openings for mounting devices in the walls of the blow-molded body. Such additional process steps result in a significantly increased price of the final product.

SUMMARY OF THE INVENTION

It is an object of the invention to provide a blow-molded body whose wall may be provided with arbitrarily selected openings at predetermined locations as early as the blow-molding process itself, whereby an open blow-molded body may be made in a single process step.

This object and others to become apparent as the specification progresses, are accomplished by the invention, according to which, briefly stated, during the inflation step predetermined wall portions of the blow-molded body are further reduced in thickness by means of an additional expansion; such further inflated portions are, by means of a counter pressure, moved back towards their original position prior to additional expansion, whereby the connections between the wall of the blow-molded body and the additionally expanded body portions are further weakened and the weakened wall portions are, not later than simultaneously with the removal of the counter pressure, separated along the zones of connection with the wall of the blow-molded body.

Thus, according to the invention, there is provided an open blow-molded body in which the wall openings may be provided at desired locations during the body-forming blow-molding operation proper. Thus, the article, upon conclusion of the inflation process, may be removed from the mold with the openings already provided therein.

The inflation pressure may be advantageously varied during the inflation step. Normally the inflation pressure is between 8 and 10 bar. This pressure may be reduced or increased towards the end of the inflation step in order to accelerate the separation of the additionally expanded and weakened wall portion so that the latter, not later than during the removal of the increased counter pressure, is separated from the wall of the blow-molded body.

The return of the additionally expanded body part is effected expediently at least once by applying an elevated counter pressure against the inflation pressure. Upon an alternating relaxation and application of the counter pressure there is effected a back-and-forth motion (oscillation) of the additionally inflated body part resulting in a rapid reduction of the wall portion in the connecting region with the wall of the blow-molded body so that a separation of the additionally expanded, thin-walled body parts may be effected without difficulty. The number of the pressure alternations is directly proportionate to the wall thickness of the blow-molded body. The plasticity or stretchability of the synthetic material may also be determinative of the frequency of the counter pressure oscillation.

The depth of the additional expansion of selected parts of the body wall for achieving a reduction of the wall thickness also plays a role in the process according to the invention. Thus, in case of a greater wall thickness and plasticity of the synthetic material used, the depth of the expansions may be increased to accelerate the process. Conversely, in case of a small wall thickness and low plasticity the depth of the expansions may be maintained at a smaller level.

It was found that in synthetic materials which are treated according to the invention and which have relatively high plasticity, the openings may be provided without leaving residual parts. The reason for this result is seen in that plastic material of the thinned wall zones of the additionally expanded parts is, during the alternating application of the counter pressure, displaced into adjoining wall portions of the blow-molded body. It has been observed that portions of the thinned walls of the additionally inflated parts are separated during the alternating application of counter pressure, while other wall portions have been driven into the adjoining wall zones of the blow-molded body.

An apparatus for performing the method according to the invention comprises a multi-part mold whose inner surfaces determine the contour of the finished blow-molded body. The mold, at predetermined locations, has ports which form openings in the wall of the mold cavity. Each port is defined by inner wall portions extending away from the mold cavity and is closed by a plug-like member forming an end wall of the port and being displaceable in the port towards and away from the mold cavity. The plug associated with each opening in the mold may be a piston-like member coupled to a controllable pressure source to exert an appropriate inwardly directed force on the outside of the piston. The cross-sectional shape of the port corresponds to the outline of the displaceable end wall which is constituted by the frontal end face of the piston-like member which may reciprocate in the cylinder-like port cavity. The port cavity and the piston-like member may be of circular or angular cross-sectional outline.

The size of the openings which may be provided in the blow-molded bodies by means of the invention may vary between wide limits and depends primarily from the outer contour of the blow-molded body. Similarly, the ports provided in the molding tool according to the invention are not limited to any particular location in the blow-molding tool. The cross-sectional outline of each port is so designed that subsequent working on the molded body is not necessary.

The invention may find application particularly in blow-molded bodies in which one or more openings are formed that need not be calibrated. Such blow-molded bodies may be hollow components of various types whose weight is reduced by providing openings therein according to the invention and whose properties may be affected by the size and number of the openings.

As an example, a blow-molded article of flat configuration with dimensions of 600×150×20 mm was made. With the process according to the invention circular openings there were provided in the wall of the article. The basic wall thickness of the blow-molded body was 3 mm, the depth of the ports in the mold corresponding to the maximum inward displacement of the plugs was 40 mm.

After introducing the parison into the form, the closing of the form and the beginning of the inflating step, the synthetic material, in its thermoplastic condition conformed to the inner wall faces of the mold and the ports therein without a tear in the plastic material. Such tearing would have meant a premature termination of the inflation step. During the inflation which signified the beginning of the process according to the invention, the wall portions of smallest thickness were achieved within the port cavity. At the end of the inflation step these wall portions had a thickness of approximately 0.5 mm. Thereafter a counter pressure was applied on the plugs arranged in the ports and the plugs were moved in an axial direction towards the cavity of the mold. Because of the still plastic phase of the synthetic material during this process step, the thinned-out wall portions in the individual ports assumed a non-uniform folded configuration; such folding may also occur about the edge of the mold wall which bounds the port and may extend into the wall of the blow-molded body.

As the counter pressure is removed from the plugs situated in the mold ports and the plugs move outwardly to the end of the respective ports, while the inflation pressure in the cavity of the mold is maintained, the part of the body wall which originally projected into the port is severed from the wall portions of the blow-molded body. In this manner, in the blow-molded body there are provided apertures of predetermined number, shape and location. It is noted that the plug may be advanced through the wall of the blow-molded body into the interior thereof.

DESCRIPTION OF THE PREFERRED EMBODIMENT

Figure 1:
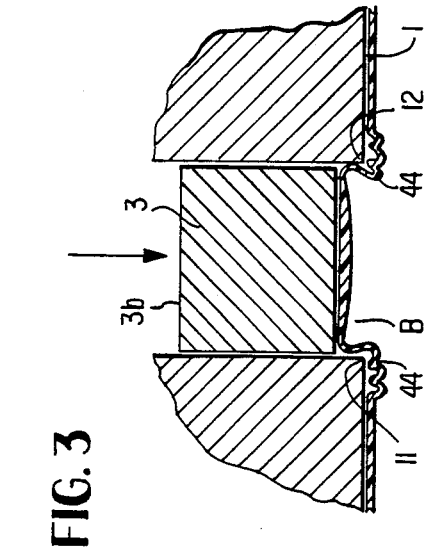
FIGS. 1, 2, 3 and 4 are schematic fragmentary sectional views of a preferred embodiment depicted in successive operational phases.

Turning now to FIG. 1, there is shown a blow mold 1 provided with a port 2 defined by wall portions 1a of the mold 1. The mold cavity A is in communication with the port cavity B. The port 2 is closed by a plug 3 fitting cross-sectionally into the port cavity B and having an end face 3a which constitutes the transverse end wall of the port 2. The blow-molded body 4 is shown subsequent to the inflation step and thus conforms to the inner wall faces defining the mold cavity A. Further, the molded body has a protuberance which has penetrated into the port cavity B and which is defined by wall portions 41, 42 and 43, conforming to the inner surfaces of the walls 1a of the mold 1 and the end face 3a of the plug (piston) 3. The protuberance is an unbroken continuation of the blow-molded body. The wall portions 41, 42 and 43 of the blow-molded body 4 are of reduced thickness as compared to the other wall parts of the blow-molded body 4.

Figure 2:
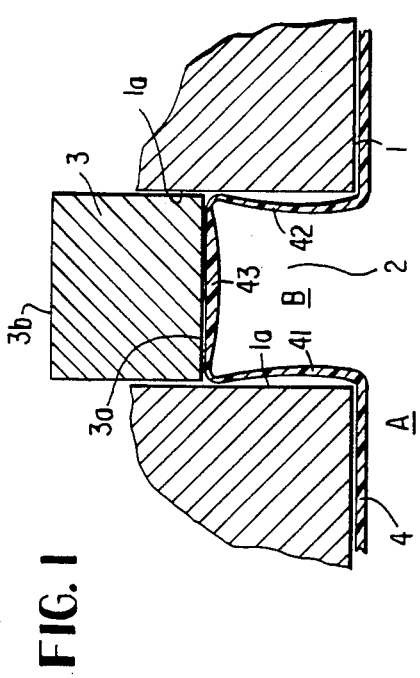

FIG. 2 depicts the initial phase of applying a counter pressure on the piston 3. The counter pressure may be effected, for example, by manually controlling a valve V of a hydraulic pressure arrangement H. The force on the end face 3b of the piston 3 overcomes the force derived from the inflation pressure inside the cavities A and B and thus the piston 3 is driven inwardly, whereby the volume of the port cavity is gradually reduced and the end face 3a presses the wall portions 41, 42 and 43 towards the mold cavity A. As a result, the lateral wall parts 41 and 42 form folds 44 which extend around the corners 11 and 12 where the walls of the mold join the walls of the port. The folds (corner folds) 44 may lead to a thickening of the body wall in those zones.

Figure 3:
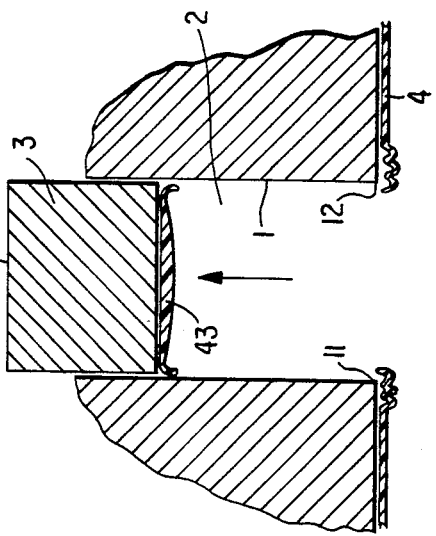

FIG. 3 illustrates an end position of plug 3 in which it essentially entirely fills the port cavity B. The folds 44 of the wall portions 41 and 42 of the blow-molded body have almost entirely changed into layered wall thickness enlargements in the zone of the edges 11 and 12 of the mold.

Figure 4:
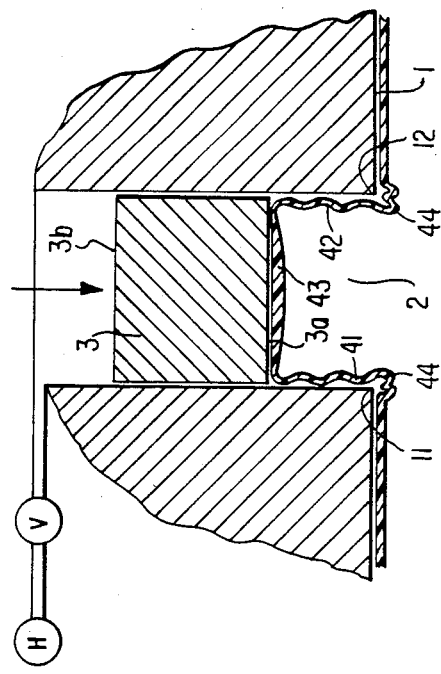

FIG. 4 depicts the operational phase in which the plug 3 has been moved outwardly as a result of a removal of the external force applied thereto, as illustrated in FIGS. 2 and 3. The wall portion 43 is, in the shown example, torn from the blow-molded body at the thinnest connecting portions with the walls 41 and 42 of the parts which have penetrated into the port 2. It is noted that by means of structural modifications, particularly of the edge zones where the mold cavity A and the port cavity B join, the separation may be effected directly at such edge zones.

It will be understood that the above description of the present invention is susceptible to various modifications, changes and adaptations, and the same are intended to be comprehended within the meaning and range of equivalents of the appended claims.

What is claimed is:

1. A method of making blow-molded bodies from thermoplastic material, comprising the following steps:
    (a) inflating a hollow parison within a mold cavity for causing the parison to expand and conform to inner wall surfaces defining the mold cavity, whereby the blow-molded body is shaped;
    (b) further inflating the blow-molded body within said mold cavity for causing a wall portion of the body to expand beyond the mold cavity from an original position into a port cavity communicating with the mold cavity thereby reducing the thickness of said wall portion;

(c) while maintaining the blow-molded body in a plastic state, applying a counter pressure on an outer face of said wall portion for moving said wall portion back in the direction of the mold cavity substantially into said original position against an inflating pressure prevailing within the blow-molded body, whereby connecting portions attaching said wall portion to said blow-molded body are reduced in thickness; and (d) discontinuing the application of the counter pressure for allowing said wall portion to be driven anew away from the mold cavity into said port cavity by the inflating pressure; said wall portion separating entirety from said blow-molded body not later than upon finally discontinuing the application of the counter pressure, whereby an aperture in the blow-molded body is formed.

2. A method as defined in claim 1, further comprising the step of varying the inflating pressure during steps (a) and (b).

3. A method as defined in claim 1, wherein steps (c) and (d) are performed repetitively.

4. A method as defined in claim 1, wherein step (c) comprises the step of thickening portions of the blow-molded body about said wall portion.

* * * * *